(12) United States Patent
Mora-Golding et al.

(10) Patent No.: US 12,111,921 B2
(45) Date of Patent: Oct. 8, 2024

(54) INCIDENT RESPONSE ACCORDING TO RISK SCORE

(71) Applicant: Denso Corporation, Kariya (JP)

(72) Inventors: Carlos Mora-Golding, Southfield, MI (US); Ameer Kashani, Southfield, MI (US); Gopalakrishnan Iyer, Santa Clara, CA (US); Hirofumi Yamashita, Southfield, MI (US)

(73) Assignee: Denso Corporation, Kariya (JP)

( * ) Notice: Subject to any disclaimer, the term of this patent is extended or adjusted under 35 U.S.C. 154(b) by 303 days.

(21) Appl. No.: 17/691,413

(22) Filed: Mar. 10, 2022

(65) Prior Publication Data
US 2023/0289435 A1    Sep. 14, 2023

(51) Int. Cl.
*G06F 21/55* (2013.01)
*B60R 25/30* (2013.01)

(52) U.S. Cl.
CPC ............ *G06F 21/552* (2013.01); *B60R 25/30* (2013.01); *G06F 21/554* (2013.01); *G06F 2221/034* (2013.01)

(58) Field of Classification Search
CPC .............. G06F 21/552; G06F 21/554; G06F 2221/034; G06F 21/577; B60R 25/30
See application file for complete search history.

(56) References Cited

U.S. PATENT DOCUMENTS

| | | | |
|---|---|---|---|
| 2008/0141374 A1* | 6/2008 | Sidiroglou | G06F 21/554 726/23 |
| 2018/0255082 A1* | 9/2018 | Ostergaard | G06N 20/00 |
| 2019/0297106 A1* | 9/2019 | Geil | H04L 63/1408 |
| 2020/0351708 A1* | 11/2020 | Maria | H04L 63/0209 |
| 2020/0389474 A1* | 12/2020 | Levy | H04L 63/1441 |

* cited by examiner

*Primary Examiner* — Farid Homayounmehr
*Assistant Examiner* — Judy Bazna
(74) *Attorney, Agent, or Firm* — Christopher G. Darrow; Darrow Mustafa PC

(57) ABSTRACT

Systems, methods, and other embodiments described herein relate to improving incident response within a vehicle environment. In one embodiment, a method includes, responsive to detecting an attack on a threatened component of a computing system, gathering information about the threatened component, including at least a dependency list that specifies related components to the threatened component. The method includes determining a risk score for the attack according to a risk level associated with the attack, a risk type of the threatened component, and combined risks associated with compromising the related components. The method includes providing a report specifying information about the attack, including at least the risk score.

17 Claims, 4 Drawing Sheets

INCIDENT RESPONSE ACCORDING TO RISK SCORE

TECHNICAL FIELD

The subject matter described herein relates in general to systems and methods for detecting and responding to attacks against an electronic device and, more particularly, to selectively responding to attacks according to a risk score.

BACKGROUND

Traditionally, vehicle security has involved a vehicle owner using a physical key to lock a door and/or start a vehicle manually. As technology advances, this traditional vehicle security has morphed into more complex systems that involve additional features but also encounter additional/different risks. For example, many vehicles now include electronic systems that have the ability to collect data about the operation of the vehicle, communicate with remote systems, receive/provide electronic controls, and so on. However, along with enriched features and connectivity to outside networks comes the potential for attacks by malicious actors. For example, malicious actors may attempt to gain access to vehicle systems in order to alter the operation of the vehicle, steal sensitive information, and so on.

Various intrusion detection systems (IDS) may function to broadly detect anomalies within a system but generally fail to accurately assess an overall impact of processing relationships and how a malicious attack may influence related systems within a vehicle. Moreover, within the context of a vehicle, such systems generally rely on remote operations centers that collect information about attacks and may remotely implement responses to the attacks that are often delayed and may not promptly resolve the effects of the attacks. Accordingly, vehicle systems remain vulnerable to adversarial attacks that can expose protected information, damage systems, and so on.

SUMMARY

In one embodiment, example systems and methods associated with improving incident response within a vehicle environment are disclosed. As previously noted, various adversarial attacks can involve attempts at gaining unauthorized access to the electronic systems of a vehicle. That is, for example, an adversary may attempt to manipulate electronic communications, manipulate the execution of programs, install malicious software, and so on. Moreover, through these attacks, the adversary can extract sensitive information, including cryptographic keys, sensitive software, etc., and/or otherwise interfere with the functioning of electronic systems of the vehicle 100 and, thereby, the functioning of the vehicle itself. As noted, intrusion detection systems within the context of a vehicle can represent a particular difficulty in that the vehicle is a mobile platform with many diverse systems and inter-related functions. By contrast, intrusion detection systems, in general, focus on enterprise or commercial contexts in which systems have static monitoring points within controlled contexts that are not limited by operational considerations of a vehicle (e.g., limited power) or the diverse connection of systems. Accordingly, detecting and responding to malicious attacks within a vehicle represents significantly distinct considerations over other approaches.

Therefore, in one embodiment, a disclosed approach includes a mechanism for monitoring attacks and responding to the attacks in a measured approach through the use of a risk score that informs the response. For example, in one arrangement, a system monitors various systems of a vehicle to detect an attack. The system may use various techniques to detect an attack, such as recognition of patterns within communications, identification of manipulated memory or control flow, and so on. In any case, the system detects the presence of an attack or at least a potential attack and proceeds to capture information about the attack in order to assess a risk. For example, the system collects an identifier of the program that is under attack and then generates a dependency list, which itemizes other processes and system components that interact with the attacked program.

From this information, the system determines a risk score associated with the attack. In at least one arrangement, the system uses a database of known attacks to analyze the current attack and generate a score. For example, the system may match the characteristics of the attack with known attacks in the database to determine a risk associated with the current attack. In a further aspect, the system determines a similarity to one or more attacks identified in the database and applies characteristics of the identified attack(s) to the current attack. In yet further arrangements, the system may apply a policy to characterize the attack instead of using a database of known attacks. In any case, the system determines the risk associated with the attack and extrapolates the risk according to the dependency list in order to assess an overall impact. From this information, the system generates the risk score that generally characterizes a risk associated with the attack.

Accordingly, using the risk score, the system can generate a report about the attack indicating characteristics of the attack and aspects of the vehicle that are affected. Moreover, in addition to providing the report to a security operations center or other cyber security entity, the system may also generate automated responses to thwart the attack. The responses can include disconnecting the vehicle from a communication link, alerting a user, re-initializing memory, and so on. In this way, the system improves a response to an electronic attack by better identifying and responding to the attack.

In one embodiment, a security system is disclosed. The security system includes one or more processors and a memory that is communicably coupled to the one or more processors. The memory stores a control module including instructions that, when executed by the one or more processors, cause the one or more processors to, responsive to detecting an attack on a threatened component of a computing system, gather information about the threatened component, including at least a dependency list that specifies related components to the threatened component. The control module includes instructions to determine a risk score for the attack according to a risk level associated with the attack, a risk type of the threatened component, and combined risks associated with compromising the related components. The control module includes instructions to provide a report specifying information about the attack, including at least the risk score.

In one embodiment, a non-transitory computer-readable medium is disclosed. The computer-readable medium stores instructions that, when executed by one or more processors, cause the one or more processors to perform the disclosed functions. The instructions include instructions to, responsive to detecting an attack on a threatened component of a computing system, gather information about the threatened component, including at least a dependency list that specifies related components to the threatened component. The instructions include instructions to determine a risk score for the attack according to a risk level associated with the attack, a risk type of the threatened component, and combined risks associated with compromising the related components. The instructions include instructions to provide a report specifying information about the attack, including at least the risk score.

In one embodiment, a method is disclosed. In one embodiment, the method includes, responsive to detecting an attack on a threatened component of a computing system, gathering information about the threatened component, including at least a dependency list that specifies related components to the threatened component. The method includes determining a risk score for the attack according to a risk level associated with the attack, a risk type of the threatened component, and combined risks associated with compromising the related components. The method includes providing a report specifying information about the attack, including at least the risk score.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements, or multiple elements may be designed as one element. In some embodiments, an element shown as an internal component of another element may be implemented as an external component and vice versa. Furthermore, elements may not be drawn to scale.

DETAILED DESCRIPTION

Figure 1:
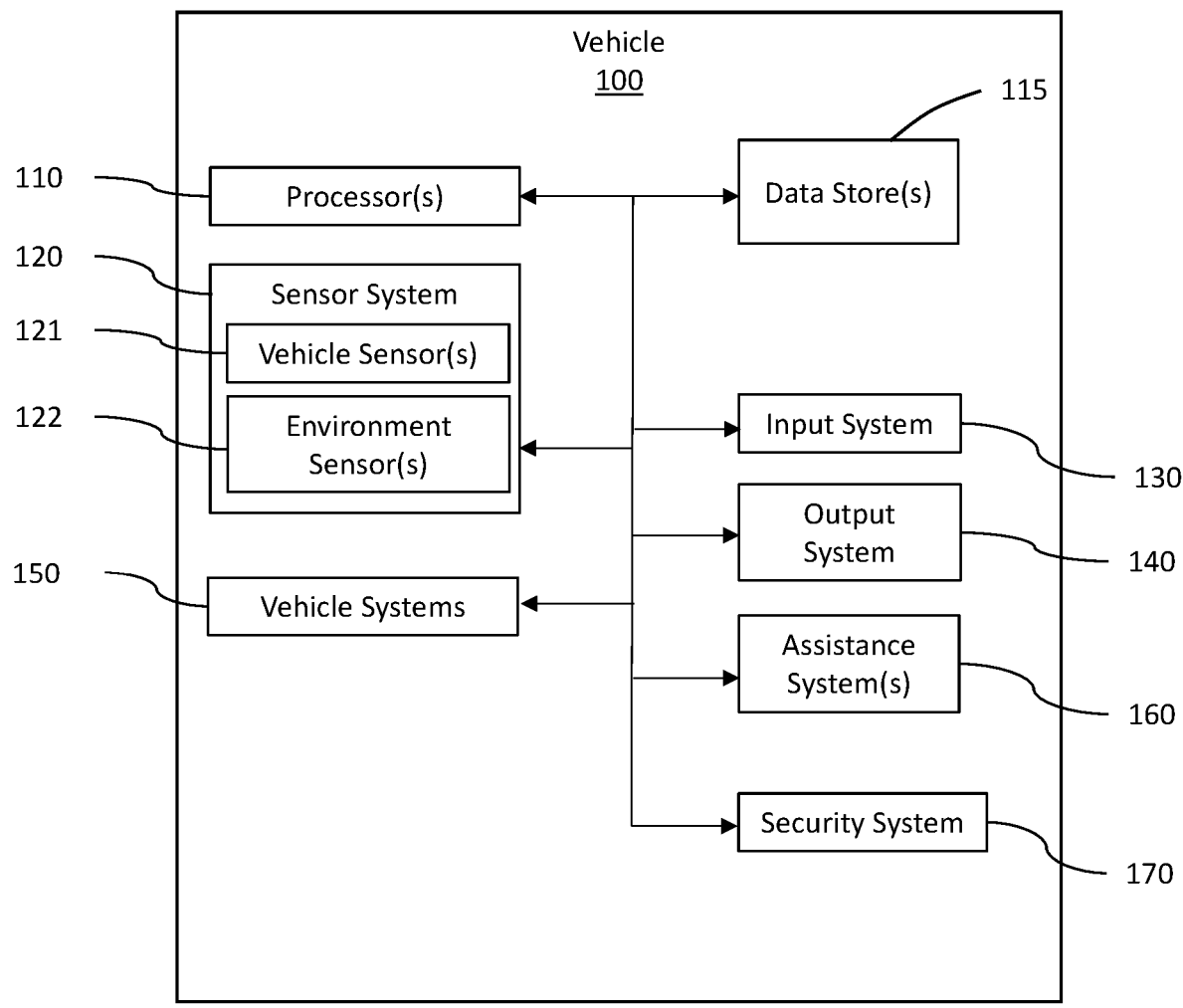
FIG. 1 illustrates one embodiment of a configuration of a vehicle in which example systems and methods may be implemented.

Systems, methods, and other embodiments associated with improving incident response within a vehicle environment are disclosed. As previously noted, attempts at gaining unauthorized access to electronic systems or otherwise frustrating the operation of such systems is problematic for vehicles. That is, for example, an adversary may attempt to manipulate electronic communications, manipulate the execution of programs, install malicious software, and so on in an attempt to gain access to the vehicle or cause damage to electronic systems of the vehicle. Moreover, through these attacks, the adversary can extract sensitive information, including cryptographic keys, sensitive software, etc., and/or otherwise interfere with the functioning of electronic systems of the vehicle 100 and, thereby, the functioning of the vehicle itself. As noted, intrusion detection systems within the context of a vehicle can represent a particular difficulty in that the vehicle is a mobile platform with many diverse systems and inter-related functions. By contrast, intrusion detection systems, in general, focus on enterprise or commercial contexts in which systems have static monitoring points within controlled contexts that are not limited by operational considerations of a vehicle (e.g., limited power) or the diverse connection of systems. Accordingly, detecting and responding to malicious attacks within a vehicle represents significantly distinct considerations over other approaches.

Therefore, in one embodiment, a disclosed approach includes a mechanism for monitoring attacks and responding to the attacks in a measured approach through the use of a risk score that informs the response and facilitates independent action. For example, in one arrangement, a security system monitors various aspects of a vehicle to detect an attack. The system may use various techniques to detect an attack, such as recognition of patterns within communications, identification of manipulated memory or control flow, and so on. In any case, the system detects the presence of an attack or at least a potential attack and proceeds to capture information about the attack in order to assess a risk. For example, the system collects an identifier of the program that is under attack and then generates a dependency list. The dependency list specifies other programs, functions, processes, and system components (e.g., shared memory) that interact with the program under attack.

From this information, the system determines a risk score associated with the attack. In at least one arrangement, the system uses a database of known attacks to analyze the current attack and generate a score. For example, the system may match the characteristics of the attack with known attacks in the database to determine a risk associated with the current attack. The database is a risk-rank database that details the characteristics of an attack, effects of an attack, and so on. Alternatively, or additionally, the system may apply a policy to characterize the attack instead of using a database of known attacks. In any case, the system determines the risk associated with the attack and extrapolates the risk according to the dependency list in order to assess an overall impact. That is, the system weighs the importance of the program under attack along with additional aspects of the vehicle that interact with the program to gauge an overall effect of the attack. From this information, the system generates the risk score that generally characterizes a risk associated with the attack.

Accordingly, using the risk score, the system can generate a report about the attack indicating characteristics of the attack and aspects of the vehicle that are effected. Moreover, in addition to providing the report to a security operations center or other cyber security entity, the system may also generate automated responses to thwart the attack. The responses can include disconnecting the vehicle from a communication link, alerting a user, re-initializing memory, and so on. In this way, the system improves a response to an electronic attack by better identifying and responding to the attack.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may instead be an electronic device associated with a transportation infrastructure (e.g., roadside unit), a cloud-based system communicating with mobile devices, or other devices that may implement electronic systems that are potentially vulnerable to malicious attack, and thus benefits from the functionality discussed herein.

The vehicle 100 also includes various elements. It will be understood that, in various embodiments, the vehicle 100 may not have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. A description of many of the elements in FIG. 1 will be provided after the discussion of FIGS. 2-4 for purposes of the brevity of this description. Additionally, it will be appreciated that for simplicity and clarity of illustration, where appropriate, reference numerals have been repeated among the different figures to indicate corresponding, analogous, or similar elements. Furthermore, it should be understood that the embodiments described herein may be practiced using various combinations of the described elements.

In any case, the vehicle 100 includes a security system 170 that functions to improve the detection of malicious attacks against electronic systems of the vehicle 100. Moreover, while depicted as a standalone component, in one or more embodiments, the security system 170 is integrated with the assistance system 160, or another similar system of the vehicle 100 to facilitate improving the security of functions of the systems/modules associated with automated and/or user-oriented controls of the vehicle 100. The noted functions and methods will become more apparent with a further discussion of the figures.

Figure 2:
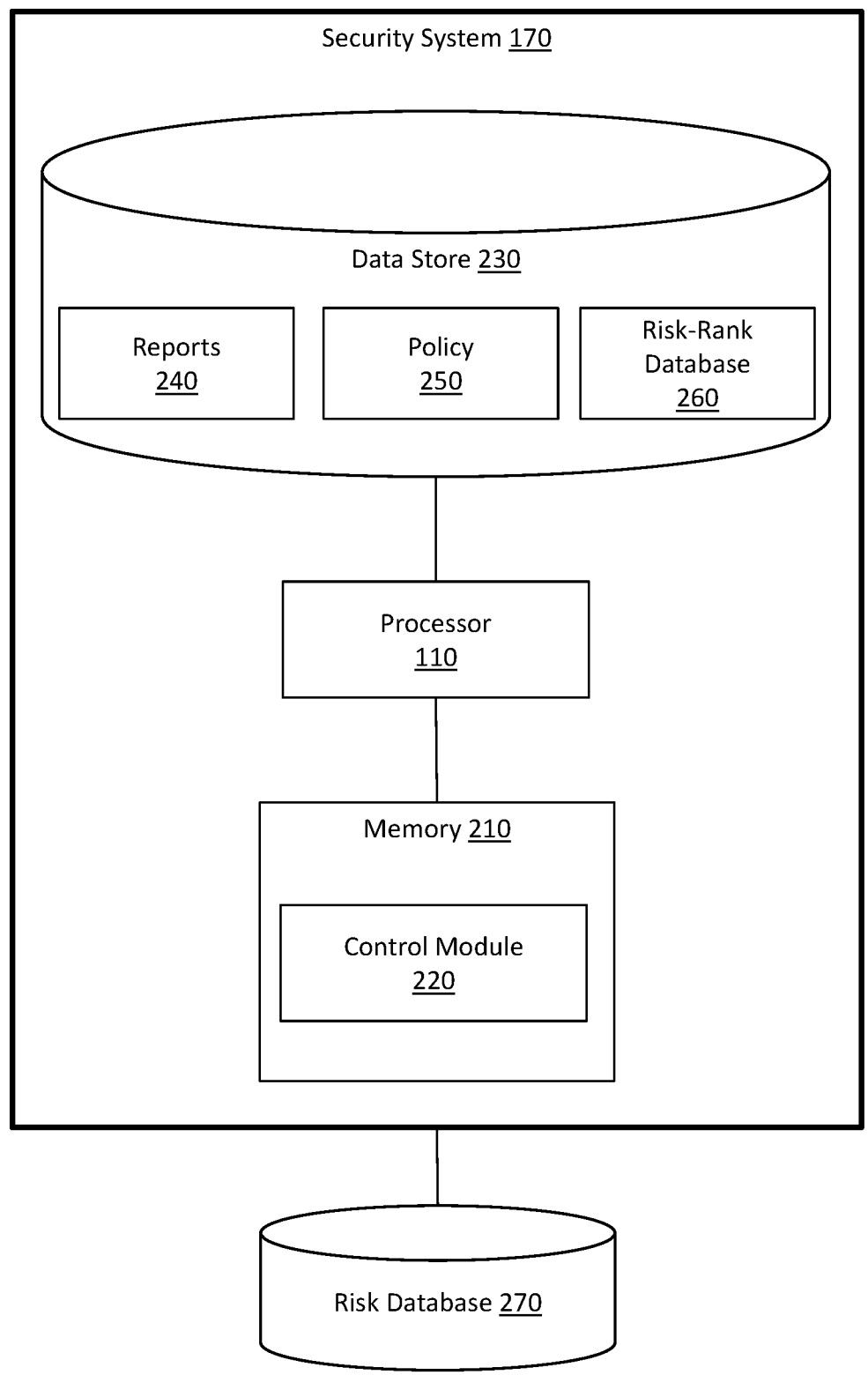
FIG. 2 illustrates one embodiment of a security system that is associated with monitoring attacks on a vehicle and responding to the attacks according to a risk score.

With reference to FIG. 2, one embodiment of the security system 170 is further illustrated. As shown, the security system 170 includes a processor 110. Accordingly, the processor 110 may be a part of the security system 170, or the security system 170 may access the processor 110 through a data bus or another communication pathway. In one or more embodiments, the processor 110 is an application-specific integrated circuit that is configured to implement functions associated with a control module 220. More generally, in one or more aspects, the processor 110 is an electronic processor, such as a microprocessor that is capable of performing various functions as described herein when executing encoded functions associated with the security system 170. Moreover, the processor 110 or another electronic processing unit associated with the security system 170 executes various programs that are to be secured/protected. In various embodiments, the particular functionality of a program may vary but can include automated driving functions (e.g., ADAS functions, machine perception, mapping, object detection/identification, path planning, vehicle control routines, and so on), functions associated with control of the vehicle 100, execution of infotainment systems within the vehicle 100, and so on. Thus, various aspects of the program may be related to functional safety of the vehicle 100, sensitive/personal information, and so on, which should be protected by improved security measures. Furthermore, it should be appreciated that the program itself can be structured in different ways but is generally formed of multiple segments. The segments include data elements (e.g., variables), and various functions (i.e., blocks of code associated with performing a particular function). Accordingly, the security system 170 functions to protect the programs against malicious attacks, as outlined further subsequently.

In one embodiment, the security system 170 includes a memory 210 that stores the control module 220 and, in various configurations, additional elements (e.g., a program). The memory 210 is a random-access memory (RAM), read-only memory (ROM), a hard disk drive, a flash memory, or other suitable memory for storing the module 220. The control module 220 is, for example, computer-readable instructions that, when executed by the processor 110, cause the processor 110 to perform the various functions disclosed herein. While, in one or more embodiments, the module 220 is instructions embodied in the memory 210, in further aspects, the module 220 includes hardware, such as processing components (e.g., controllers), circuits, etc. for independently performing one or more of the noted functions. Thus, the control module 220 may be embodied as instructions within the memory 210 or as a standalone component, such as a system-on-a-chip (SoC), ASIC, or another electronic device.

Furthermore, in one embodiment, the security system 170 includes a data store 230. The data store 230 is, in one arrangement, an electronically-based data structure for storing information. For example, in one approach, the data store 230 is a database that is stored in the memory 210 or another suitable electronic storage medium (e.g., RAM, ROM, on-chip cache, etc.), and that is configured with routines that can be executed by the processor 110 for analyzing stored data, providing stored data, organizing stored data, and so on. In any case, in one arrangement, the data store 230 stores data used by the control module 220 in executing various functions. In one embodiment, the data store 230 includes reports 240, a policy 250, and a risk-rank database 260 along with, for example, other information that is used by the control module 220.

As an initial matter, the risk-rank database 260 maintains information about various attacks and associated risks. That is, for example, the risk-rank database 260 includes information for individual attacks that have been previously observed and logged. The information about an attack in the risk-rank database 260 can include identifying information/characteristics, including specific patterns of an associated attacking program (e.g., a hash), names of files, locations of installation, behaviors of the attacking program (e.g., elements of a system with which the program interacts, program flows which deviate due to the attacking program, etc.), communications generated by the attacking program, memory access and storing patterns, and so on. In general, the identifying information includes known information about the attacking program that is useful in identifying the program. Moreover, in addition to the identifying information, the risk-rank database 260 also includes, in at least one implementation, an assessed characterization of the risk that is specific to the program. The characterization of the risk may take different forms depending on the implementation, such as a type of the risk, a specific impact of the program, and so on. For example, the type of the risk may specify how the program attacks a system (e.g., via manipulating program flow, altering memory, etc.). By contrast, the specific impact of the program includes particular processes, memory locations, forms of communications, and other elements associated with the attacking program.

It should be appreciated that while the security system 170 may undertake initial identification of an attack, in general, the security system 170 populates the risk-rank database 260 through updates from an outside source, such as risk database 270. Accordingly, the risk database 270 may be updated and controlled by a security operations center (SOC) or another authority that aggregates information about known attacks and provides the information to client devices, such as the security system 170. In this way, the security system 170 is able to maintain up-to-date awareness about threats and thereby better identify and thwart attacks.

Accordingly, the control module 220 generally includes instructions that function to control the processor 110 to monitor electronic systems of the vehicle 100 in order to detect the occurrence of an attack. For example, the control module 220 monitors various aspects of the electronic systems of the vehicle 100 for anomalies that indicate an attack, such as the characteristics defined in the risk-rank database 260. In further approaches, the control module 220 implements the policy 250 that defines anomalous behaviors of the system, such as access to specific memory addresses by particular programs, abnormalities in communications, process interruptions, and so on.

Figure 3:
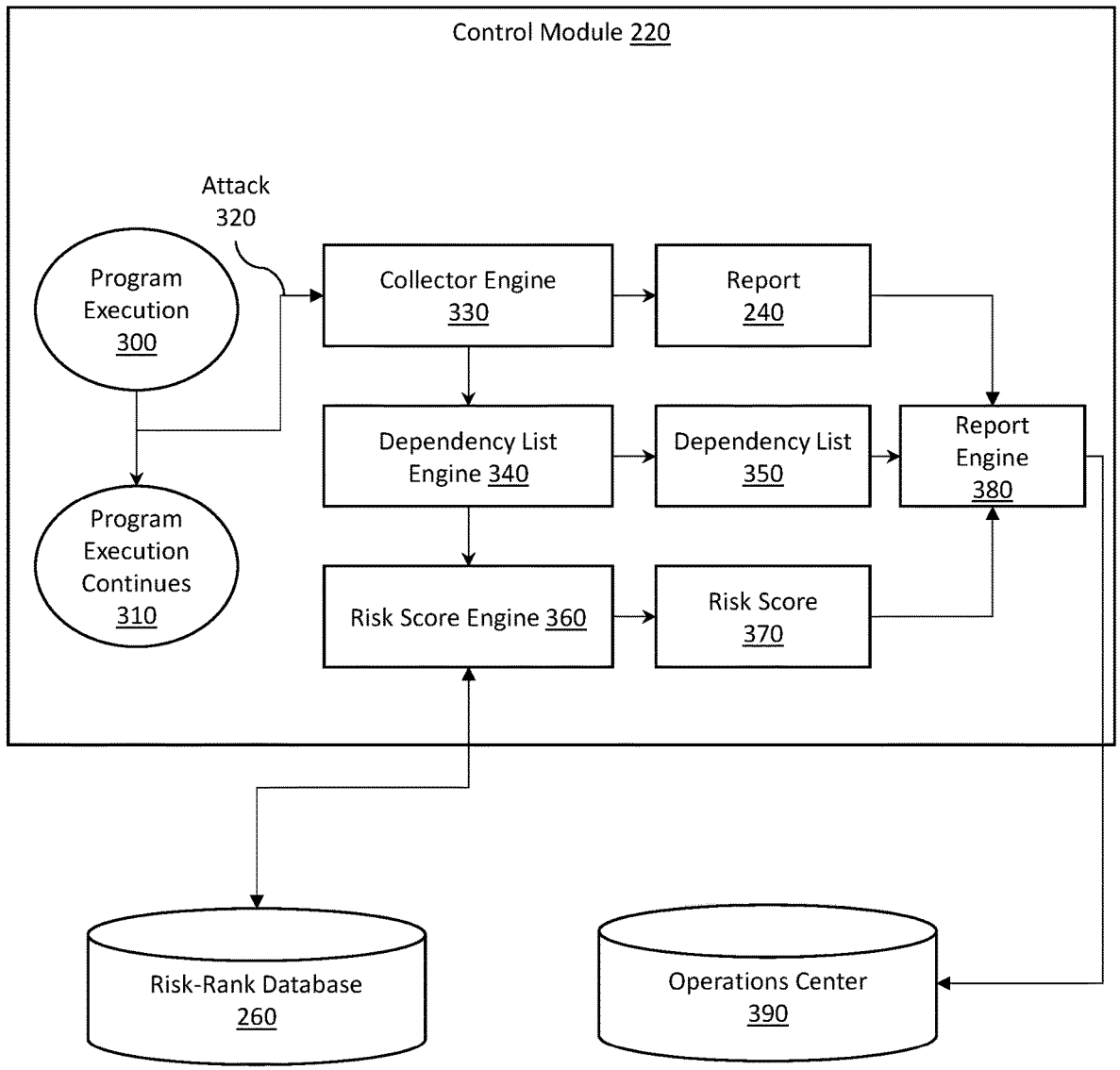
FIG. 3 illustrates one example of sub-modules of the security system.

As an additional explanation, consider FIG. 3, which illustrates further functions of the control module 220. Broadly, the components of the control module 220 as depicted in FIG. 3 are abstractions of different functions and associations thereof along with representations of various elements that may be present within the security system 170. Thus, the elements described along with FIG. 3 are, in at least one aspect, representative of functions that the instructions of the control module 220 implement when executed by the processor 110.

Accordingly, in FIG. 3, execution of a representative program 300 is shown. As the program 300 executes, the control module 220 detects an attack 320 according to the monitoring of the various characteristics, as outlined previously. While the executing continues at 310, the collector engine 330 gathers information about the program 300. For example, the collector engine 330, in at least one approach, collects a program identifier, a state of the program, a memory state of associated memory, active file descriptors, current network communications, and so on. The collector engine 330 aggregates the information in a report 240 and also passes the program identifier to a dependency list engine 340. The dependency list engine 340 functions to create a dependency list 350, which may alternatively take the form of a graph of the program 300. The dependency list 350 identifies elements of the vehicle 100 with an association to the program 300. Accordingly, the dependency list 350 can include other programs/processes that interact with the program 300, including shared libraries, hardware elements associated with the program, shared memory addresses, the privilege level of the program 300, and so on. In general, the dependency list engine 340 generates the dependency list 350 to identify system-wide relationships of the program 300 in order to facilitate the determination of an overall effect or potential of the attack by illustrating which aspects of the vehicle 100 may encounter difficulties due to the attack.

In any case, the dependency list engine 340 further provides the dependency list 350 to the risk score engine 360. The risk score engine 360 functions to generate a risk score 370. In one arrangement, the risk score engine 360 accesses information about known attacks in the risk-rank database 260. As previously discussed, the risk-rank database 260 includes characteristics of known attacks, which the control module 220 may use to identify the occurrence of an attack. Moreover, the risk-rank database 260 also includes a risk assessment or impact of the known attacks. Thus, the risk-rank database 260 may include known issues with an attack, such as systems impacted by the attack, how the attack impacts the systems, and so on. From this information, the risk score engine 360 generates the risk score 370. For example, in one approach, the risk score engine 360 uses a set of rules to determine the risk score 370 associated with a particular attack. The rules may relate different aspects of the attack to characteristics of the program and relationships with dependencies from the dependency list 350. In one approach, the risk score engine 360 uses a defined numerical risk (e.g., 0-100) from the risk-rank database 260 associated with the attack and extrapolates the defined risk according to the characteristics of the program 300 (e.g., privilege level, etc.) and the dependency list (e.g., the criticality of associated programs/elements, the privilege level of associated processes, etc.).

In one approach, the risk score engine 360 combines the associated risk of the related elements with the risk of the program 300 from the attack according to a weighted sum, which may depend on various factors, such as an extent of the relationship, characteristics of the program 300, etc. As a further example, the risk score engine 360 may base the risk score 370 on knowledge of memory corruption issues, information leakage, a size of a program/number of lines of code, etc., which may carry different weights in determining the final risk score 370. The risk score 370 itself may take different forms according to the particular implementation, such as a numerical value (e.g., 0-100), a coded risk category (e.g., Risk A, B, C, D, etc.), a binary decision (e.g., risk or not), and so on. In this way, the control module 220 is able to assess an extent of the risk associated with the attack.

The control module 220 then uses the risk score 370 to provide a response to the attack. In one approach, the report engine 380 aggregates the risk score 370 for the program 300 and the dependency list 350 into the report 240 to provide an overall assessment of the attack 320. The report engine 380 may then provide the report 240 to an operations center (i.e., a security operations center) associated with a manufacturer of the vehicle 100. The operations center 390 may then induce the control module 220 in one or more vehicles to perform one or more actions according to the risk score 370 in order to thwart the attack and/or prevent the spread of the attack. In yet an alternative arrangement, the control module 220 determines and executes a response according to the risk score 370. For example, the control module 220, in one or more approaches, responds to the attack 320 by removing connectivity to the vehicle 100, reducing functionality of one or more systems in the vehicle 100 (e.g., limiting or supervising execution of functions), alerting a user (e.g., a driver/owner), re-initializing memory with a randomized offset, erasing personally identifiable information (PII) and/or other sensitive information (e.g., cryptographic keys, etc.), preventing the vehicle 100 from driving, and so on. In this way, the security system 170 is able to improve the detection and response to malicious attacks against vehicle systems.

Figure 4:
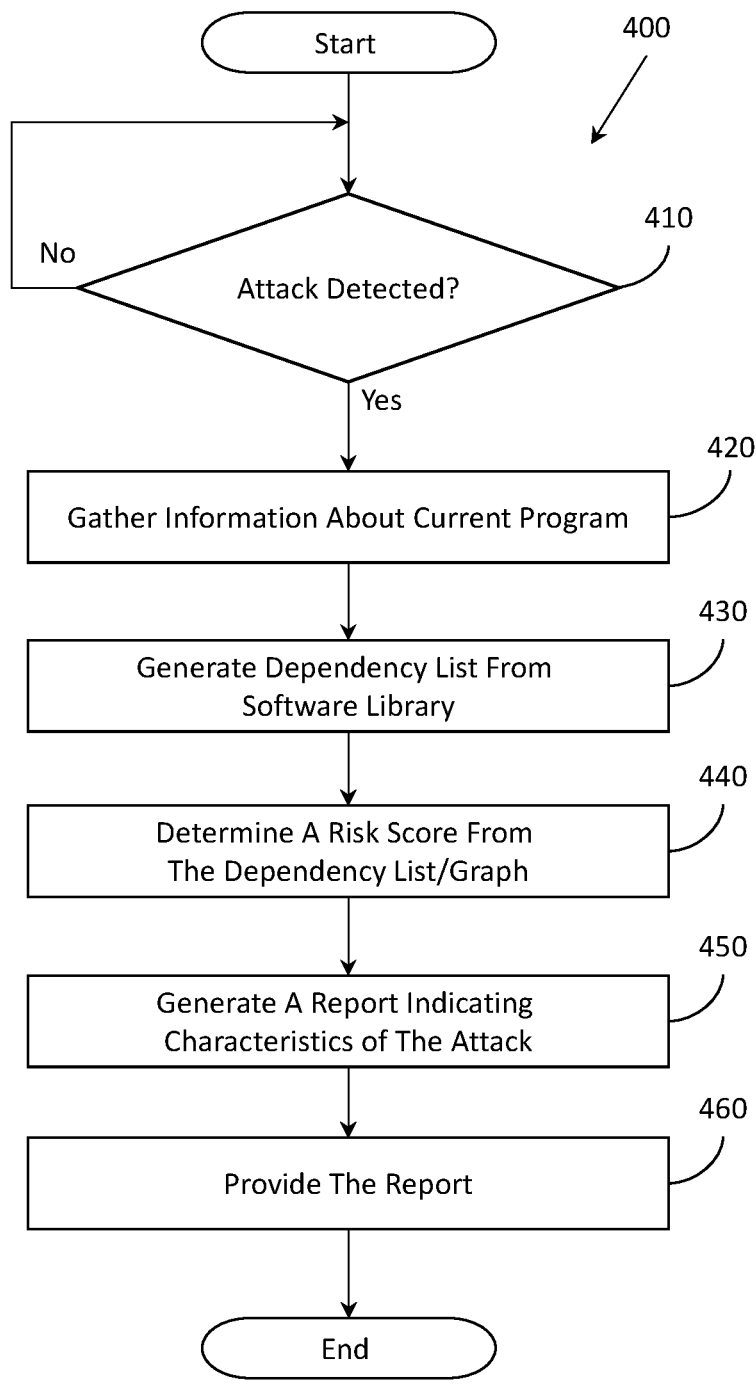
FIG. 4 illustrates one embodiment of a method associated with generating a risk score.

Additional aspects of securing electronic systems of a vehicle against malicious attacks using active threat monitoring will be discussed in relation to FIG. 4. FIG. 4 illustrates a method 400 associated with actively monitoring and responding to threats against vehicle systems. Method 400 will be discussed from the perspective of the security system 170 of FIG. 1. While method 400 is discussed in combination with the security system 170, it should be appreciated that the method 400 is not limited to being implemented within the security system 170 but is instead one example of a system that may implement the method 400.

At 410, the control module 220 determines whether an attack is presently occurring. In one arrangement, the control module 220 monitors various systems of the vehicle 100 to detect an attack on a threatened component. It should be appreciated that, in general, the security system 170 is embedded within the vehicle 100 to monitor various electronic computing systems therein. Thus, the control module 220 may undertake various techniques to perform the monitoring, including passively observing different systems through sniffing communications and otherwise acquiring information from electronic control units (ECUs), instrumentation, data networks, and so on within the vehicle 100 (e.g., logged telematics data). Accordingly, the control module 220 analyzes the available information to detect anomalies in the operation of the threatened component and to identify characteristics of an attack associated with the threatened component itself. As noted previously, the anomalies can include changes in frequency of communication packets, an ECU sending messages that are generally not associated with the ECU, aberrations in control-flow integrity, a process interacting with a component with which the process does not typically interact, and so on. While several examples are listed, it should be appreciated that this listing is not intended to be exhaustive but is merely exemplary of some instances of possible anomalies.

At 420, the control module 220 gathers information about the threatened component. As an initial aspect, consider that the threatened component is generally a process/program that is executing within a system of the vehicle 100, although the threatened component may alternatively be a hardware element or information within a hardware element, such as a memory. In any case, the control module 220 gathers the information about the component by determining a program identifier, a control flow marker associated with a current execution point, a state of a memory stack, an indicator about why a communication is flagged, and so on. The control module 220 gathers the information that is available about the current state of the program and related components/execution states in order to facilitate the subsequent assessment of the risk.

At 430, the control module 220 generates the dependency list. In one arrangement, the control module 220 generates the dependency list to identify relationships between the threatened component and related components with which the threatened component has a link, relationship, or may otherwise interact. For example, related components can include other associated processes, dependent/shared memory addresses, common hardware components, and so on. The control module 220 identifies elements in the dependency list to provide awareness about potential ramifications if the threatened component is compromised since a related component may also fail or otherwise be compromised if the threatened component fails. Accordingly, the control module 220 maps relationships between the threatened component and dependent aspects of the vehicle 100 by, in one configuration, tracing the control flow of the threatened component. The control flow reveals interactions between components, such as shared data between processes, and so on. In yet a further example, the control module 220 uses a pre-populated list of dependencies for systems of the vehicle 100 that may be provided by a manufacturer or is generated periodically. In such a case, the control module 220 may instead parse the pre-populated list to determine the relationship of components for a program under attack.

At 440, the control module 220 determines a risk score for the attack. In one arrangement, the control module 220 considers various information about the attack and associated components, such as a risk level associated with the attack, a risk type of the threatened component, combined risks associated with compromising the related components, and so on. For example, the control module 220 determines the risk level by identifying the attack within the risk-rank database 260 that indicates characteristics of known threats. Moreover, the risk type may relate to a privilege level of the threatened component, a function of the threatened component (e.g., functional safety, criticality as defined by ISO 21434, etc.), and so on. Lastly, the control module 220 considers the combined risk or dependency risk associated with other impacted components of the vehicle 100 according to the dependency list. That is, the dependency list informs an impact of the attack and potential failure of the threatened component on other related components of the vehicle 100.

Accordingly, the control module 220 may generate the risk score from the noted information in different ways according to the implementation. As one approach, the control module 220 determines risk score according to a weighted average of the identified risks (e.g., to the threatened component, to the dependencies, etc.). Alternatively, the control module 220 may assign the risk score according to a greatest risk identified for any element. In any case, determining the risk score includes assessing the risks of the different elements. The risks generally include the criticality of a threatened component, shared memory, privilege level, sensitivity of potentially exposed information, and so on.

At 450, the control module 220 generates the report 240 indicating characteristics of the attack. In one arrangement, the control module 220 aggregates the gathered and assessed information and combines the information together to form the report 240. The report may include an identifier of the threatened component, characteristics of the attack, including a current state of a memory stack, and the dependency list. The report 240 then characterizes the attack in order to quantify the occurrence and provide information as a log or as a direct communication so that the attack can be further analyzed by, for example, offline components (e.g., heuristics, machine learning algorithms, etc.) or a remote operations center.

At 460, the control module 220 provides the report specifying the information about the attack, including the risk score and/or other gathered information. In at least one approach, the control module 220, as part of providing the report 240, generates an automated response to the attack. For example, the control module 220 may selectively generate the automated response according to whether the risk score satisfies a response threshold that identifies when the attack is of a particular threat level that garners a direct response because of, for example, an immediacy of the threat. The control module 220 may also generate the automated response according to a time-based threshold, which is independent of other conditions, such as the aforementioned risk score level. Thus, the control module 220, for example, may not communicate the report 240 unless the risk score satisfies the response threshold and instead may retain the report 240 for subsequent upload at a defined time interval.

However, when the risk score does satisfy (e.g., exceed), the control module 220 may perform various automated responses and, in one arrangement, may do so according to an escalation of the risk score between various values. For example, the control module 220 may simply communicate the report 240 to a security operations center that can assess the report 240 and determine a particular response. In a further scenario, the control module 220 executes a response to directly counteract the attack by, for example, performing one or more of changing a mode of systems within the vehicle to a "safe mode" that limits accessibility and functionality of various systems, removing connectivity (i.e., wireless communication links) from various systems, alerting a user, clearing memory of information, re-initializing memory with a random offset, and so on. In this way, the security system 170 is able to improve the detection and response to malicious attacks on vehicle systems.

Additionally, it should be appreciated that the security system 170 from FIG. 1 can be configured in various arrangements with separate integrated circuits and/or electronic chips. In such embodiments, the control module 220 is embodied as a separate integrated circuit. The circuits are connected via connection paths to provide for communicating signals between the separate circuits. Of course, while separate integrated circuits are discussed, in various embodiments, the circuits may be integrated into a common integrated circuit and/or integrated circuit board. Additionally, the integrated circuits may be combined into fewer integrated circuits or divided into more integrated circuits. In further embodiments, portions of the functionality associated with the module 220 may be embodied as firmware executable by a processor and stored in a non-transitory memory. In still further embodiments, the module 220 is integrated as hardware components of the processor 110.

In another embodiment, the described methods and/or their equivalents may be implemented with computer-executable instructions. Thus, in one embodiment, a non-transitory computer-readable medium is configured with stored computer-executable instructions that, when executed by a machine (e.g., processor, computer, and so on), cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner. "Manual mode" means that all of or a majority of the navigation and/or maneuvering of the vehicle is performed according to inputs received from a user (e.g., human driver).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is fully automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by the security system 170 to ensure the vehicle 100 remains within defined state constraints.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 (e.g., data store 230) for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected" or "communicably connected," as used throughout this description, can include direct or indirect connections, including connections without direct physical contact.

In one or more arrangements, the one or more data stores 115 can include map data. The map data can include maps of one or more geographic areas. In some instances, the map data can include information (e.g., metadata, labels, etc.) on roads, traffic control devices, road markings, structures, features, and/or landmarks in the one or more geographic areas. In some instances, the map data can include aerial/satellite views. In some instances, the map data can include ground views of an area, including 360-degree ground views. The map data can include measurements, dimensions, distances, and/or information for one or more items included in the map data and/or relative to other items included in the map data. The map data can include a digital map with information about road geometry. The map data can further include feature-based map data such as information about relative locations of buildings, curbs, poles, etc. In one or more arrangements, the map data can include one or more terrain maps.

The one or more data stores 115 can include sensor data. In this context, "sensor data" means any information from the sensors that the vehicle 100 is equipped with, including the capabilities and other information about such sensors.

As noted above, the vehicle 100 can include the sensor system 120. The sensor system 120 can include one or more sensors. "Sensor" means any device, component, and/or system that can detect, perceive, and/or sense something. The one or more sensors can be configured to operate in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself or interior compartments of the vehicle 100. In one or more arrangements, the vehicle sensor(s) 121 can be configured to detect and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system, and/or other suitable sensors. The vehicle sensor(s) 121 can be configured to detect and/or sense one or more characteristics of the vehicle 100. In one or more arrangements, the vehicle sensor(s) 121 can include a speedometer to determine a current speed of the vehicle 100. Moreover, the vehicle sensor system 121 can include sensors throughout a passenger compartment, such as pressure/weight sensors in seats, seatbelt sensors, camera(s), and so on.

Alternatively, or in addition, the sensor system 120 can include one or more environment sensors 122 configured to acquire and/or sense driving environment data. "Driving environment data" includes data or information about the external environment in which an autonomous vehicle is located or one or more portions thereof. For example, the one or more environment sensors 122 can be configured to detect and/or sense obstacles in at least a portion of the external environment of the vehicle 100 and/or information/data about such obstacles. Such obstacles may be stationary objects and/or dynamic objects. The one or more environment sensors 122 can be configured to detect, and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described. As an example, in one or more arrangements, the sensor system 120 can include one or more radar sensors, one or more LIDAR sensors, one or more sonar sensors, and/or one or more cameras. In one or more arrangements, the one or more cameras can be high dynamic range (HDR) cameras or infrared (IR) cameras.

The vehicle 100 can include an input system 130. An "input system" includes, without limitation, devices, components, systems, elements or arrangements or groups thereof that enable information/data to be entered into a machine. The input system 130 can receive an input from a vehicle passenger (e.g., an operator or a passenger). The vehicle 100 can include an output system 140. An "output system" includes any device, component, or arrangement or groups thereof that enable information/data to be presented to a vehicle passenger (e.g., a person, a vehicle passenger, etc.).

The vehicle 100 can include one or more vehicle systems 150. Various examples of the one or more vehicle systems 150 are shown in FIG. 1, however, the vehicle 100 can include a different combination of systems than illustrated in the provided example. In one example, the vehicle 100 can include a propulsion system, a braking system, a steering system, throttle system, a transmission system, a signaling system, a navigation system, and so on. The noted systems can separately or in combination include one or more devices, components, and/or a combination thereof.

By way of example, the navigation system can include one or more devices, applications, and/or combinations thereof configured to determine the geographic location of the vehicle 100 and/or to determine a travel route for the vehicle 100. The navigation system can include one or more mapping applications to determine a travel route for the vehicle 100. The navigation system can include a global positioning system, a local positioning system or a geolocation system.

The processor(s) 110, the security system 170, and/or the assistance system 160 can be operatively connected to communicate with the various vehicle systems 150 and/or individual components thereof. For example, returning to FIG. 1, the processor(s) 110 and/or the assistance system 160 can be in communication to send and/or receive information from the various vehicle systems 150 to control the movement, speed, maneuvering, heading, direction, etc. of the vehicle 100. The processor(s) 110, the security system 170, and/or the assistance system 160 may control some or all of these vehicle systems 150 and, thus, may be partially or fully autonomous.

The processor(s) 110, the security system 170, and/or the assistance system 160 can be operatively connected to communicate with the various vehicle systems 150 and/or individual components thereof. For example, returning to FIG. 1, the processor(s) 110, the security system 170, and/or the assistance system 160 can be in communication to send and/or receive information from the various vehicle systems 150 to control the movement, speed, maneuvering, heading, direction, etc. of the vehicle 100. The processor(s) 110, the security system 170, and/or the assistance system 160 may control some or all of these vehicle systems 150.

The processor(s) 110, the security system 170, and/or the assistance system 160 may be operable to control the navigation and/or maneuvering of the vehicle 100 by controlling one or more of the vehicle systems 150 and/or components thereof. For instance, when operating in an autonomous mode, the processor(s) 110, the security system 170, and/or the assistance system 160 can control the direction and/or speed of the vehicle 100. The processor(s) 110, the security system 170, and/or the assistance system 160 can cause the vehicle 100 to accelerate (e.g., by increasing the supply of energy provided to the engine), decelerate (e.g., by decreasing the supply of energy to the engine and/or by applying brakes) and/or change direction (e.g., by turning the front two wheels).

Moreover, the security system 170 and/or the assistance system 160 can function to perform various driving-related tasks. The vehicle 100 can include one or more actuators. The actuators can be any element or combination of elements operable to modify, adjust and/or alter one or more of the vehicle systems or components thereof responsive to receiving signals or other inputs from the processor(s) 110 and/or the assistance system 160. Any suitable actuator can be used. For instance, the one or more actuators can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor (s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more modules that form the assistance system 160. The assistance system 160 can be configured to receive data from the sensor system 120 and/or any other type of system capable of capturing information relating to the vehicle 100 and/or the external environment of the vehicle 100. In one or more arrangements, the assistance system 160 can use such data to generate one or more driving scene models. The assistance system 160 can determine the position and velocity of the vehicle 100. The assistance system 160 can determine the location of obstacles, or other environmental features, including traffic signs, trees, shrubs, neighboring vehicles, pedestrians, and so on.

The assistance system 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The assistance system 160, either independently or in combination with the security system 170, can be configured to determine travel path(s), current autonomous driving maneuvers for the vehicle 100, future autonomous driving maneuvers, and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The assistance system 160 can be configured to implement determined driving maneuvers. The assistance system 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The assistance system 160 can be configured to execute various vehicle functions and/or to transmit data to, receive data from, interact with, and/or control the vehicle 100 or one or more systems thereof (e.g., one or more of vehicle systems 150).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product, which comprises all the features enabling the implementation of the methods described herein and, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include but are not limited to, a floppy disk, a flexible disk, a hard disk, a magnetic tape, another magnetic medium, an ASIC, a CD, another optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that, when executed, perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A security system, comprising:
one or more processors; and
a memory communicably coupled to the one or more processors and storing:
a control module including instructions that, when executed by the one or more processors, cause the one or more processors to:
responsive to detecting an attack on a threatened component of a computing system, gather information about the threatened component, including at least a dependency list that specifies related components to the threatened component,
wherein the control module includes instructions to gather the information including instructions to identify information about the threatened component and generate the dependency list by identifying the related components according to interactions with the threatened component, the interactions including at least shared memory, and execution dependencies;
determine a risk score for the attack according to a risk level associated with the attack, a risk type of the threatened component, and combined risks associated with compromising the related components; and
provide a report specifying information about the attack, including at least the risk score.

2. The security system of claim 1, wherein the control module includes instructions to determine the risk score including instructions to identify the attack within a risk database that indicates characteristics of known threats, and instructions to generate the risk score using the characteristics including at least the risk level derived from the risk database in combination with the risk type, and the combined risks that is an effect on the related components from the attack.

3. The security system of claim 1, wherein the control module includes instructions to generate the dependency list including instructions to parse a pre-populated list to identify relationships between the threatened component and the related components.

4. The security system of claim 1, wherein the control module includes instructions to provide the report including instructions to generate an automated response to the attack when the risk score satisfies a response threshold, the automated response including at least one of controlling the threatened component, and a computing system associated with the threatened component to counteract the attack.

5. The security system of claim 1, wherein the control module includes instructions to provide the report including instructions to communicate the report to a security operations center for reporting the attack, the report including an identifier of the threatened component, characteristics of the attack including a current state of a memory stack, the dependency list, and the risk score.

6. The security system of claim 1, wherein the control module includes instructions to detect the attack including instructions to detect an anomaly in operation of the threatened component and identifying characteristics of a computing system associated with the threatened component.

7. The security system of claim 1, wherein the security system is embedded within a vehicle, and the computing system is part of the vehicle.

8. A non-transitory computer-readable medium storing instructions that, when executed by one or more processors, cause the one or more processors to:
    responsive to detecting an attack on a threatened component of a computing system, gather information about the threatened component, including at least a dependency list that specifies related components to the threatened component,
    wherein the instructions to gather the information include instructions to identify information about the threatened component and generate the dependency list by identifying the related components according to interactions with the threatened component, the interactions including at least shared memory, and execution dependencies;
    determine a risk score for the attack according to a risk level associated with the attack, a risk type of the threatened component, and combined risks associated with compromising the related components; and
    provide a report specifying information about the attack, including at least the risk score.

9. The non-transitory computer-readable medium of claim 8, wherein the instructions to determine the risk score include instructions to identify the attack within a risk database that indicates characteristics of known threats, and instructions to generate the risk score using the characteristics including at least the risk level derived from the risk database in combination with the risk type, and the combined risks that is an effect on the related components from the attack.

10. The non-transitory computer-readable medium of claim 8, wherein the instructions to generate the dependency list include instructions to parse a pre-populated list to identify relationships between the threatened component and the related components.

11. The non-transitory computer-readable medium of claim 8, wherein the instructions to provide the report include instructions to generate an automated response to the attack when the risk score satisfies a response threshold, the automated response including at least one of controlling the threatened component, and a computing system associated with the threatened component to counteract the attack.

12. A method, comprising:
    responsive to detecting an attack on a threatened component of a computing system, gathering information about the threatened component, including at least a dependency list that specifies related components to the threatened component,
    wherein gathering the information includes identifying information about the threatened component and generating the dependency list by identifying the related components according to interactions with the threatened component, the interactions including at least shared memory, and execution dependencies;
    determining a risk score for the attack according to a risk level associated with the attack, a risk type of the threatened component, and combined risks associated with compromising the related components; and
    providing a report specifying information about the attack, including at least the risk score.

13. The method of claim 12, wherein determining the risk score includes identifying the attack within a risk database that indicates characteristics of known threats, and generating the risk score using the characteristics including at least the risk level derived from the risk database in combination with the risk type, and the combined risks that is an effect on the related components from the attack.

14. The method of claim 12, wherein generating the dependency list includes parsing a pre-populated list to identify relationships between the threatened component and the related components.

15. The method of claim 12, wherein providing the report includes generating an automated response to the attack when the risk score satisfies a response threshold, the automated response including at least one of controlling the threatened component, and a computing system associated with the threatened component to counteract the attack.

16. The method of claim 12, wherein providing the report includes communicating the report to a security operations center for reporting the attack, the report including an identifier of the threatened component, characteristics of the attack including a current state of a memory stack, the dependency list, and the risk score.

17. The method of claim 12, wherein detecting the attack includes detecting an anomaly in operation of the threatened component and identifying characteristics of a computing system associated with the threatened component.

* * * * *